(12) United States Patent
Van Der Schuit

(10) Patent No.: US 10,753,040 B2
(45) Date of Patent: *Aug. 25, 2020

(54) CABLE WITH A FIRST AND A SECOND THIMBLE AND AT LEAST ONE YARN, AND METHOD FOR PRODUCING AN ENDLESS WINDING CABLE

(71) Applicant: Cabin Air Group B.V., Joure (NL)

(72) Inventor: Rinze Jan Van Der Schuit, Oranjewoud (NL)

(73) Assignee: Cabin Air Group B.V., Joure (NL)

( * ) Notice: Subject to any disclaimer, the term of this patent is extended or adjusted under 35 U.S.C. 154(b) by 225 days.

This patent is subject to a terminal disclaimer.

(21) Appl. No.: 15/776,119

(22) PCT Filed: Nov. 14, 2016

(86) PCT No.: PCT/NL2016/050793
§ 371 (c)(1),
(2) Date: May 15, 2018

(87) PCT Pub. No.: WO2017/086778
PCT Pub. Date: May 26, 2017

(65) Prior Publication Data
US 2018/0334776 A1    Nov. 22, 2018

(30) Foreign Application Priority Data
Nov. 19, 2015  (NL) ....................................  2015822

(51) Int. Cl.
*D07B 7/16* (2006.01)
*D07B 1/14* (2006.01)
(Continued)

(52) U.S. Cl.
CPC ............. *D07B 7/165* (2013.01); *D07B 1/145* (2013.01); *D07B 1/18* (2013.01); *F16G 11/146* (2013.01);
(Continued)

(58) Field of Classification Search
CPC .......... D07B 1/18; D07B 1/145; D07B 7/165; F16G 11/146; B66C 1/12
See application file for complete search history.

(56) References Cited

U.S. PATENT DOCUMENTS 2,598,829 A * 6/1952 Pollard .................... F16G 9/00
57/201
3,056,706 A * 10/1962 Knoppel ................ B29C 70/20
174/177

(Continued)

FOREIGN PATENT DOCUMENTS

CN    1370251 A    9/2002
CN    1388844 A    1/2003
(Continued)

OTHER PUBLICATIONS

H.A. McKenna, et al., Handbook of Fibre Rope Technology, Jan. 1, 2004, pp. 230-232, 262, XP055263278, England, ISBN 978-1-85573-606-1.
(Continued)

*Primary Examiner* — Shaun R Hurley
(74) *Attorney, Agent, or Firm* — Rogowski Law LLC

(57) ABSTRACT

A cable comprises a first and a second thimble (2, 4), and at least one main yarn (6) and an auxiliary yarn (7). The first and the second thimble are provided at opposite ends of the cable. The at least one main yarn (6) and the auxiliary yarn (7) each forms turns around the first and second thimble (2, 4). Each thimble (2, 4) comprises a bearing surface (40), and holds a stack (19) of layers (10) of turns of the main yarn (6).

(Continued)

A stack (119) of turns of the auxiliary yarn (7) comprising at least a first layer (13) of turns of the auxiliary yarn (7) lies on the bearing surface (40) of the respective thimble (2, 4).

20 Claims, 3 Drawing Sheets

(51) Int. Cl.
*F16G 11/14* (2006.01)
*D07B 1/18* (2006.01)

(52) U.S. Cl.
CPC ............... *D07B 2201/2087* (2013.01); *D07B 2201/2096* (2013.01); *D07B 2205/201* (2013.01); *D07B 2205/205* (2013.01); *D07B 2205/2014* (2013.01); *D07B 2205/2042* (2013.01); *D07B 2205/2046* (2013.01); *D07B 2205/2096* (2013.01); *D07B 2205/30* (2013.01); *D07B 2205/3007* (2013.01); *D07B 2301/5504* (2013.01); *D07B 2301/5577* (2013.01); *D07B 2401/207* (2013.01); *D07B 2401/2075* (2013.01); *D07B 2501/203* (2013.01); *D07B 2501/2015* (2013.01); *D07B 2501/2061* (2013.01)

(56) References Cited

U.S. PATENT DOCUMENTS

| | | | | |
|---|---|---|---|---|
| 3,222,858 A * | 12/1965 | Gilmore | ........... | D07B 1/18 57/201 |
| 4,025,100 A * | 5/1977 | Bridgehouse | ........... | B66C 1/18 294/74 |
| 4,193,319 A | 3/1980 | Langford | | |
| 4,354,704 A * | 10/1982 | Mayerjak | ........... | B66C 1/12 294/74 |
| 4,569,190 A * | 2/1986 | Gilmore | ........... | B60R 22/22 297/468 |
| 4,843,807 A * | 7/1989 | von Danwitz | ........ | D07B 7/165 57/201 |
| 6,289,742 B1 * | 9/2001 | De Angelis | ........... | B66B 7/06 73/158 |
| 7,137,483 B2 | 11/2006 | Kato et al. | | |
| 9,896,799 B2 | 2/2018 | Van Der Schuit | | |
| 9,915,029 B2 | 3/2018 | Van Der Schuit | | |
| 2007/0111588 A1 | 5/2007 | Weinberger | | |
| 2007/0177707 A1 * | 8/2007 | Rawdon | ........... | F16G 11/146 376/254 |
| 2008/0061572 A1 * | 3/2008 | Harada | ........... | D07B 1/145 294/74 |
| 2009/0078922 A1 * | 3/2009 | Kempf | ........... | D07B 1/025 254/266 |
| 2010/0019082 A1 * | 1/2010 | Carter | ........... | B64C 13/30 244/99.3 |
| 2011/0089130 A1 * | 4/2011 | Volker | ........... | B66C 1/12 212/262 |
| 2017/0037570 A1 * | 2/2017 | Van Der Schuit | ... | G02B 6/4296 |

FOREIGN PATENT DOCUMENTS

| | | |
|---|---|---|
| CN | 1873087 A | 12/2006 |
| CN | 102838012 A | 12/2012 |
| DE | 39 24 379 A1 | 1/1991 |
| DE | 3924379 C2 | 12/1995 |
| GB | 1495604 | 12/1977 |
| GB | 2144681 A1 | 3/1985 |
| JP | 2000 239983 A | 9/2000 |
| JP | 2014 218335 A | 11/2014 |
| KR | 101495645 B1 | 2/2015 |
| WO | 0114630 A1 | 3/2001 |
| WO | 03048023 A1 | 6/2003 |
| WO | 2005/07528 A1 | 8/2005 |
| WO | 2015/178769 A1 | 11/2015 |

OTHER PUBLICATIONS

Anonymous, "End Fittings/Cable Terminations—FibreMax All Fibres Used to the Max . . . ", Nov. 18, 2012, XP055263148.
Search Report dated Nov. 29, 2018 in respect of CN Pat. App. 2016800677669.
Communication from European Patent Office in respect of EP 16 810 491.7 (dated Nov. 20, 2018).
FibreMax—worlds strongest cable: "FibreMax company introduction", (Jan. 27, 2015), retrieved from the internet: URL: https://www.youtube.com/watch?v=D-lag89jO2E [retrieved on Nov. 28, 2018].

* cited by examiner

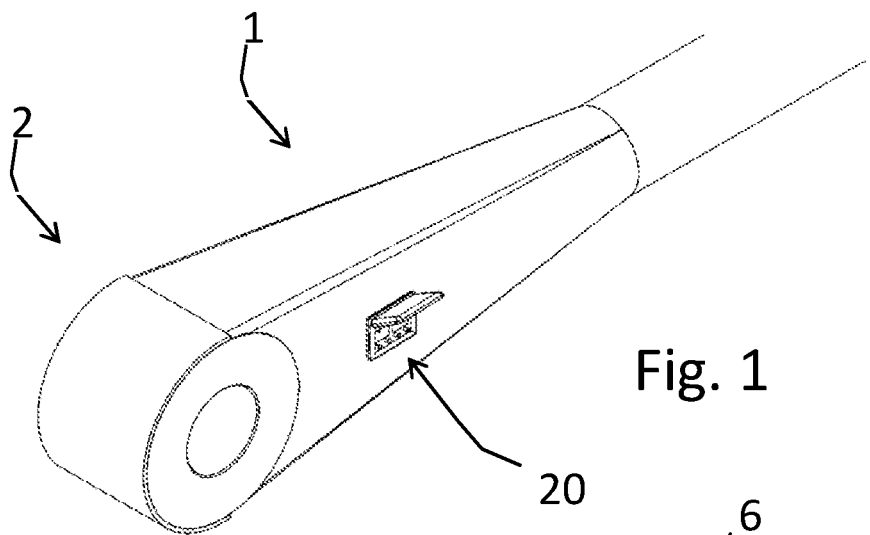
Fig. 1
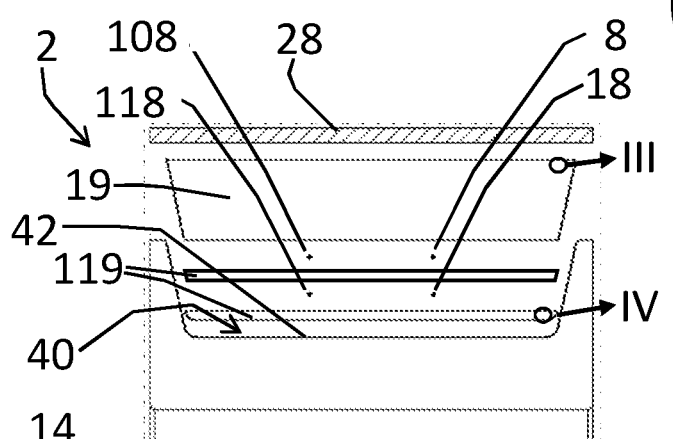
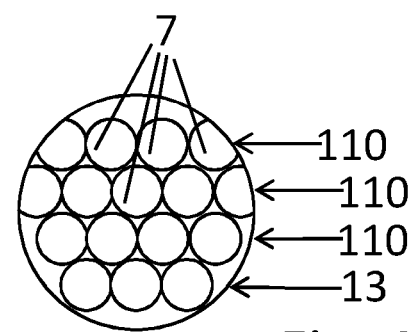
Fig. 3
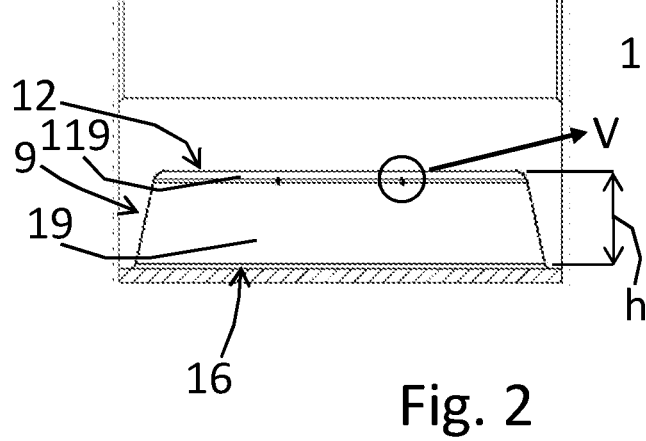
Fig. 2
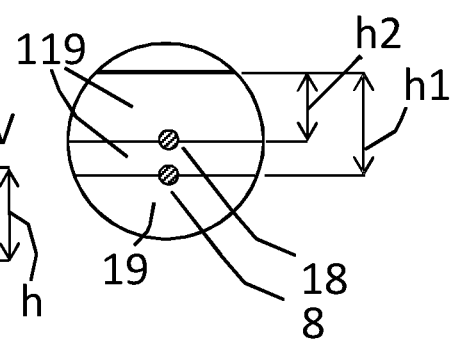
Fig. 4
Fig. 5

CABLE WITH A FIRST AND A SECOND THIMBLE AND AT LEAST ONE YARN, AND METHOD FOR PRODUCING AN ENDLESS WINDING CABLE

CROSS-REFERENCE TO RELATED APPLICATIONS

This application is a national stage application (under 35 USC § 371) of PCT/NL2016/050793, filed Nov. 14, 2016, which claims benefit of Netherlands application No. 2015822, filed Nov. 19, 2015, the contents of each of which are incorporated by reference herein.

BACKGROUND OF THE INVENTION

The invention relates to a cable that can be used in different types of industry, including but not limited to offshore, mining and heavy lifting and construction. In offshore, a cable of this type can be used as a mooring line for a floating oil exploration or production facility, or for a floating wind turbine. In mining and heavy lifting such a cable may be used as a pendant for a crane. In construction such a cable may be used as a tension member in a bridge or suspension cable of a roof.

A cable of this type is known from WO-A1-2005/075286, which discloses a cable which is used as a stay for sailing vessels. The stay comprises plastic load bearing fibres which extend between a first and a second thimble and turn around these thimbles forming a stack of fibres.

A disadvantage of the known cable is that it wears more quickly than one would predict based on the properties of the fibres and the load on the cable.

The invention aims to solve this problem, or at least to provide an alternative. In particular, the invention aims to provide a cable with a longer life span.

SUMMARY OF THE INVENTION

A cable comprises a first thimble and a second thimble, and at least one main yarn. The main yarn comprises fibres/fibers of a first type. The first thimble and the second thimble are provided at opposite ends of the cable. The main yarn extends from the first thimble to the second thimble, turns around the second thimble, extends from the second thimble to the first thimble, and turns around the first thimble, such that the main yarn forms turns around the first and second thimbles. Each thimble comprises a bearing surface, and holds a stack of layers of turns of the main yarn. The cable comprises fibres/fibers of a second type, wherein the second type is different from the first type. A stack comprising at least a first layer of the fibres/fibers of the second type lies on the bearing surface of at least one of the first and second thimbles. The stack of layers of turns of the main yarn is located on top of the stack of the fibres/fibers of the second type.

Within the context of this document, a turn of a yarn may be either a semi-continuous loop, or a continuous loop. The term semi-continuous loop refers to the fact that the yarn has a finite length with distinct ends, while in a continuous loop a yarn has no ends. So in a semi-continuous loop, the at least one yarn is wound around the first and second thimble a plurality of times, forming a plurality of loops around these thimbles, which is not completely continuous as the ends of the yarn are not connected to each other. Within the context of this document, a thimble is defined as a ring of any shape and made of any material around which the at least one yarn is turned.

The invention is based on the insight that cables of this type that are subject to a large number of load cycles fail after a prolonged period, because the varying cyclic loads result in a small movement of the first layer of yarn turns along the bearing surface of the thimble. Repetition of this movement a large number of times results in wearing and breaking of the yarns of this lower layer. After they have broken, the next layer of yarns starts wearing, until so many layers have worn that the remaining layers can no longer take the full load applied on the cable, and the cable fails completely. The stack of the fibres/fibers of the second type avoids direct contact between the main yarn and the bearing surface. As a result, the main yarn does not wear due to movements of the main yarn relative to the bearing surface. The properties of the fibres/fibers of the second type are chosen such that their wear is less than that of the main yarn.

In an embodiment, the fibres/fibers of the second type have a friction coefficient relative to the material of the bearing surface, for example stainless steel, which is lower than a friction coefficient relative to the material of the bearing surface of the fibres/fibers of the first type. Thanks to the lower friction coefficient, any movement between the auxiliary yarn and the bearing surface results in less warmth being generated and hence in less wear.

In an embodiment, the fibres/fibers of the second type have a modulus of elasticity which is higher than the modulus of elasticity of the fibres/fibers of the first type. This results in less elongation of the auxiliary yarn when the cable is subject to a load, and thus in less movement between the auxiliary yarn and the bearing surface when the cable is subjected to load cycles.

In an embodiment, the cable comprises at least one auxiliary yarn, which comprises the fibres/fibers of the second type. The auxiliary yarn extends from the first thimble to the second thimble, turns around the second thimble, extends from the second thimble to the first thimble, and turns around the first thimble, such that the auxiliary yarn forms turns around the first and second thimbles, and the first layer of the fibres/fibers of the second type is a first layer of turns of the auxiliary yarn. By having the fibres/fibers of the second type in the form of an auxiliary yarn and winding this around the thimbles too, the fibres/fibers of the second type will elongate together with the main yarns under load. This reduces the movement between the fibres/fibers of the second type and the main yarns, resulting in even less wear.

In an alternative embodiment, the cable comprises a sheet made of the fibres/fibers of the second type. The sheet comprises at least the first layer of the fibres/fibers of the second type, and is positioned on the bearing surface of at least one of the first and second thimbles. Such a sheet is easily and quickly positioned on the bearing surface of the thimble, after which the winding of the main yarn may start directly.

In particular, the sheet made of the fibres/fibers of the second type is a non-woven sheet, a woven sheet, a braided sheet, or a knitted sheet.

In an embodiment, the stack of the fibres/fibers of the second type comprises a plurality of layers, in particular at least five layers, more in particular at least ten layers, more in particular at least twenty layers. Because there is more than one layer of the fibres/fibers of the second type, one or more of these layers may wear before direct contact between the main yarn and the bearing surface arises. This increases the life span of the cable even further.

In an embodiment, an overall stack height is defined as the distance from the first layer of the fibres/fibers of the second type to a last layer of turns of the main yarn, and a stack height of the fibres/fibers of the second type is at least 1%, in particular at least 2%, more in particular at least 5%, of the overall stack height. This increases the life span of the cable, because the stack of the fibres/fibers of the second type wears before direct contact between the main yarn and the bearing surface arises.

In an embodiment, an overall stack height is defined as the distance from the first layer of the fibres/fibers of the second type to a last layer of turns of the main yarn, and a stack height of the layers the fibres/fibers of the second type is less than 25%, in particular less than 15%, more in particular less than 10% of the overall stack height. A maximum height of stack of the fibres/fibers of the second type provides a balance between the extended life span, and the extra cost and cable thickness due to these layers.

The invention further relates to a cable comprising a first thimble and a second thimble, and at least one yarn. The first thimble and the second thimble are provided at opposite ends of the cable. The at least one yarn extends from the first thimble to the second thimble, turns around the second thimble, extends from the second thimble to the first thimble, and turns around the first thimble, such that the at least one yarn forms turns around the first and second thimbles. Each thimble comprises a bearing surface, and holds a stack of layers of turns of the at least one yarn. A first layer of turns of the at least one yarn lies on the bearing surface of the respective thimble. The bearing surface of at least one of the thimbles is provided with a friction reducing coating.

Within the context of this document, a friction reducing coating is a coating that provides the bearing surface with a friction coefficient between the bearing surface and the yarns that is lower than the friction coefficient between a bearing surface of manually polished stainless steel with a surface roughness of $R_A$ of 0.3 μm and the same yarns.

By applying a friction reducing coating on the bearing surface of the thimble, the wear due to repetitive movement between the yarns and the bearing surface is reduced, so that it takes longer before the yarns start breaking. A friction reducing coating is advantageous in combination with the fibres/fibers of the second type of the present invention, i.e. the fibres/fibers that lie on the bearing surface are the fibres/fibers of the second type. However, a friction reducing coating is advantageous without fibres/fibers of the second type too, i.e. in an embodiment wherein the main yarns lie on the bearing surface.

In an embodiment, the friction reducing coating comprises a fluoropolymer. Such a friction reducing coating has a low friction coefficient.

In particular, the friction reducing coating comprises polytetrafluoroethylene. This material, as well as some related friction reducing materials, are sold under the DuPont owned trade mark Teflon®.

In an embodiment, the bearing surfaces of both thimbles are provided with the friction reducing coating.

In an embodiment, the thimble is a metal thimble, in particular a steel thimble. A metal thimble has good mechanical properties.

In particular, the bearing surface is pre-treated by abrasive blasting before applying the coating. This results in a better adhesion of the coating to the thimble.

In particular, the bearing surface is pre-treated by polishing before applying the coating. More in particular, the bearing surface is manually polished. Such a polished surface further decreases the wear of the yarns.

In an embodiment, the bearing surface without the coating has a surface roughness $R_A$ in the range of 0.1-3.0 μm. A surface roughness in this range provides both lower wear of the yarns, and/or an improved adhesion of the coating to the thimble.

In particular, the bearing surface has a surface roughness $R_A$ in the range of 0.24-0.36 μm, more in particular 0.27-0.33 μm. A surface roughness in this range results in a lower wear of the yarns.

In a variant, the bearing surface has a surface roughness $R_A$ in the range of 1.6-2.4 μm, in particular 1.8-2.2 μm. A surface roughness in this range provides an improved adhesion of the coating to the thimble.

The invention further relates to a cable comprising a first thimble and a second thimble, at least one yarn, and at least a first conductive fibre/fiber for monitoring the cable. The first and the second thimble are provided at opposite ends of the cable. The at least one yarn extends from the first thimble to the second thimble, turns around the second thimble, extends from the second thimble to the first thimble, and turns around the first thimble, such that the at least one yarn forms turns around the first and second thimbles. Each thimble holds a stack of layers of turns of the at least one yarn. An inside of the stack is defined as a side of a first layer of turns of the at least one yarn being closest to a centre/center of the respective thimble. An outside of the stack is defined as a side of a last layer of turns of the at least one yarn being farthest away of the centre/center of the respective thimble. A stack height is defined as a distance from the inside of the stack to the outside of the stack. The first conductive fibre/fiber is designed to signal the wear of the yarn turns by breaking when a predetermined portion of turns of the at least one yarn breaks. The first conductive fibre/fiber is positioned at the first thimble between the turns of the at least one yarn at a first predetermined height of the stack measured from the inside of the stack, and the first predetermined height is less than 50% of the stack height.

This aspect of the invention is based on the above described insight in the wear mechanism of cables of this type. Once the yarn turns close to the conductive fibre/fiber wear and break, the conductive fibre/fiber itself will break too. By locating the conductive fibre/fiber at a predetermined height in the stack, and by measuring whether the conductive fibre/fiber is still conductive over its full length, a user can derive that a certain part of the yarns have broken. If the relevant material properties, such as the resistance against wear, of the yarns and the conductive fibre/fiber are the same, they will break approximately at the same time. Accordingly, the conductive fibre/fiber breaks when approximately all layers of yarns below the conductive fibre/fiber have broken. If the relevant material properties differ, i.e. either the yarns or the conductive fibre/fiber wears quicker than the other one, the breaking will not be at the same time, but it will be possible to determine what portion of the yarn turns have broken when the conductive fibre/fiber breaks, based on the known difference between the relevant material properties, and/or based on wear tests. The exact predetermined height of the conductive fibre/fiber will be determined on the basis of these differences and of the desired safety margin of the cable, i.e. the difference between the advertised break load and the actual break load of a new cable. When the conductive fibre/fiber breaks, and as a result is not conductive anymore, the user knows that a certain amount of the load of the cable is gone and that the actual break load of the cable is close to the advertised break load and that the cable should be replaced immediately, or within a known period of time. By positioning the conductive fibre/fiber at a predetermined height which is less than 50% of the stack height, the conductive fibre/fiber is within the lower half of the yarns, and at least 50% of the yarns is still intact when the conductive fibre/fiber breaks. As a result, a cable according to the invention provides a much more reliable indication of the residual strength, and thus the wear, than a cable of the prior art of which just the elongation could be measured.

A conductive fibre/fiber is advantageous in combination with the fibres/fibers of the second type of the present invention. In particular, a conductive fibre/fiber is positioned at the first thimble between the stack of layers of turns of the main yarn and the stack of the fibres/fibers of the second type. This enables signalling that substantially all fibres/fibers of the second type have worn, and that the cable needs to be replaced within a specified period of time, e.g. immediately, as the turns of the main yarn start to wear. However, a conductive fibre/fiber is advantageous in a cable without auxiliary yarns too, i.e. in an embodiment wherein the main yarns lie on the bearing surface.

In particular, the predetermined height is less than 40%, more in particular less than 30%, even more in particular less than 20% of the stack height. A lower predetermined height results in a cable which requires less yarn turns for the same design load, as the conductive fibre/fiber will enable an earlier warning that a corresponding portion of the yarns have broken.

In an embodiment, the cable comprises a plurality of conductive fibres/fibers. The plurality of conductive fibres/fibers includes the first conductive fibre/fiber. By using a plurality of conductive fibres/fibers, a more detailed and/or reliable insight in the residual strength and life expectancy of the cable is obtainable.

An embodiment comprises a plurality of conductive fibres/fibers, wherein at least two of the plurality of conductive fibres/fibers are positioned at the first thimble at the same layer of turns of the main or auxiliary yarn, spaced apart from each other in a width direction of the first thimble. This enables a more reliable monitoring of the cable in cases of unequal loads on one of the thimbles which may result in a quicker wear at one side, in width direction, of the respective thimble than at the other side.

In particular, a part of the plurality of conductive fibres/fibers is positioned at the first thimble between the turns of the at least one yarn at one or more further predetermined heights of the stack, wherein the further predetermined heights of the stack are different from the first predetermined height of the stack. Positioning conductive fibres/fibers at different heights enables obtaining a more detailed insight in the residual strength and life expectancy of the cable, as breaking of each of the conductive fibres/fibers corresponds to a certain amount of wear of the yarn turns.

More in particular, the cable comprises a second conductive fibre/fiber provided at the first thimble between the turns of the at least one yarn at a second predetermined height of the stack, and the second predetermined height of the stack is less than the first predetermined height of the stack. The second conductive fibre/fiber at a lower predetermined height enables a pre-warning of the wear of the cable. While the wear is not so much, that the cable needs to be replaced, the second conductive fibre/fiber will break when the cable is used and wears, which enables the user to observe that wear to a predetermined level has occurred and that actions, such as ordering a new cable, could or should be performed.

In an embodiment, the first conductive fibre/fiber extends at least from the first thimble to the second thimble, and is positioned at the second thimble between the turns of the at least one yarn at approximately the same first predetermined height of the stack measured from the inside of the stack as at the first thimble. This embodiment provides a simple solution for measuring the wear at both thimbles with just one conductive fibre/fiber. The wear at one thimble might be greater than that at the other thimble. The conductive fibre/fiber will break at the thimble where the wear is greatest, enabling a warning signal to the user. For the user it is not important to know where the wear occurs, but much more important to know that there is wear at one or more of the critical points at one of the thimbles.

In an embodiment, the cable comprises a cable cover which extends around the cable from the first thimble to the second thimble, and bundles all main yarns and fibres/fibers of the second type extending between the first and the second thimble in one compact bundle in a middle section of the cable. This results in a compact cable.

In an embodiment, the fibres/fibers of the first type shows less creep than the fibres/fibers of the second type. In particular, the fibres/fibers of the first type are carbon fibres/fibers, basalt fibres/fibers, or plastic fibres/fibers, in particular polyamide fibres/fibers, polyester fibres/fibers, polypropylene fibres/fibers, polyethylene fibres/fibers, aramid fibres/fibers, LCAP fibres/fibers, or PBO fibres/fibers. Each of these types of fibres/fibers has its own properties, which makes it suitable for specific purposes. An advantage of aramid yarns is that they show very low creep.

In an embodiment, the fibres/fibers of the second type are HMPE fibres/fibers. This type of fibres/fibers has a relative high modulus of elasticity, and a low friction coefficient.

DESCRIPTION OF THE DRAWINGS

The invention, its effects, and advantages will be explained in more detail on the basis of the schematic drawing, in which:

FIG. 1 shows an end of a cable according to the invention;
FIG. 2 shows a cross section through a thimble of the cable of FIG. 1;
FIG. 3 shows detail III from FIG. 2;
FIG. 4 shows detail IV from FIG. 2;
FIG. 5. shows detail V from FIG. 2.

DETAILED DESCRIPTION

Figure 6:
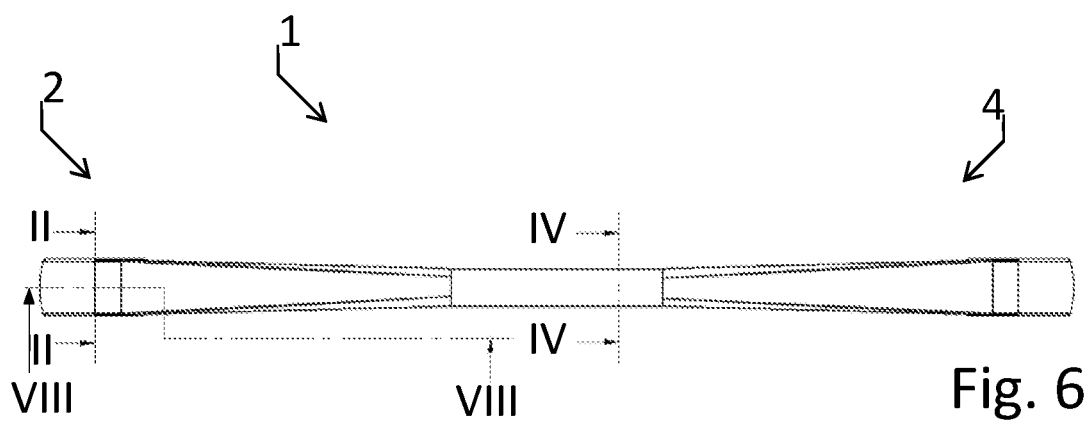
FIG. 6 shows a top view of the cable of FIG. 1.

The FIGS. 1-9 show a cable according to a first embodiment of the invention, which is denoted in its entirety by reference number 1. The cable 1 has a first thimble 2 and a second thimble 4, a plurality of main yarns 6, a plurality of auxiliary yarns 7, and a plurality of conductive fibres/fibers, in this embodiment four optical fibres/fibers 8, 18, 108, 118 for signalling wear of the cable 1. The first 2 and the second 4 thimble are made of stainless steel, and are provided at opposite ends of the cable 1. The plurality of main yarns 6 are in this embodiment ten main yarns 6 which all extend from the first to the second thimble, turn around the second thimble 4, extend from the second thimble 4 to the first thimble 2, and turn around the first thimble 2. In this manner each of the plurality of main yarns 6 forms a semi-continuous loop around the first and second thimbles. This loop is repeated a plurality of times, in this embodiment 950 times. So each of the main yarns 6 makes 950 turns, resulting in a total of 9500 turns of main yarns 6. The main yarns 6 consist of fibres/fibers, in this embodiment aramid fibres/fibers of 3220 dTex. These main yarns are sold under the name Twaron® 2200 by Teijin Aramid. The plurality of auxiliary yarns 7 are in this embodiment ten auxiliary yarns 7 which all extend from the first to the second thimble, turn around the second thimble 4, extend from the second thimble 4 to the first thimble 2, and turn around the first thimble 2. In this manner each of the plurality of auxiliary yarns 7 forms a semi-continuous loop around the first and second thimbles. This loop is repeated a plurality of times, in this embodiment 50 times. So each of the auxiliary yarns 7 makes 50 turns, resulting in a total of 500 turns of auxiliary yarns 7. The auxiliary yarns 7 consist of fibres/fibers, in this embodiment HMPE (high-modulus polyethylene) fibres/fibers, which are sold under the name Dyneema® by DSM Dyneema B.V. This type of fibre/fiber has a higher modulus of elasticity, and a lower friction coefficient, than the aramid fibres/fibers of the main yarns 6.

FIG. 2 shows that the thimble 2 holds a main stack 9 which comprises a stack 19 with a plurality of layers 10 of turns of the main yarns 6, and a stack 119 with a plurality of layers 110 of turns of the auxiliary yarns 7. The stack 119 with the plurality of layers 110 of turns of the auxiliary yarns 7 is provided on a bearing surface 40 of the first thimble 2. The stack 19 of layers 10 of turns of the main yarns 6 is provided on the stack 119 of turns of the auxiliary yarns 7. This is shown in more detail in FIGS. 3 and 4. The second thimble 4 holds layers of the same turns of the main yarns 6 and of the auxiliary yarns 7 in the same manner and is thus not shown in detail. The properties of the auxiliary yarns 7, in this embodiment both a higher modulus of elasticity, and a lower friction coefficient, than the fibres/fibers of the main yarns 6, result in a lower wear of the auxiliary yarns 7, than the wear of the main yarns 6 if these were in direct contact with bearing surface 40. At the same time, the fibres/fibers of the main yarns 6 show less creep than the auxiliary yarns 7, resulting in a dimensionally more stable cable 1 than a cable made just of the auxiliary yarns 7.

An inside of the stack 12 is defined as a side of a first layer 13 of turns of the auxiliary yarns 7 being closest to a centre/center 14 of the thimble 2. An outside of the stack 16 is defined as a side of a last layer 15 of turns of the main yarns 6 being farthest away from the centre/center 14 of the thimble 2. A stack height h is defined as the distance from the inside of the stack 12 to the outside of the stack 16.

The first, second, third and fourth optical fibres/fibers 8, 18, 108, 118 are designed to signal the wear of the turns of the auxiliary yarns 7 by breaking when a predetermined portion of the turns of the auxiliary yarns 7 break. FIGS. 2 and 5 show that the first and third optical fibres/fibers 8, 108 are positioned at the first thimble 2 between the main yarns 6 and the auxiliary yarns 7 at a first predetermined height h1 of the main stack 9 measured from the inside of the stack 12, spaced apart in the width direction of the first thimble 2. The first predetermined height h1 is in this embodiment 5% of the stack height h. The first and third optical fibres/fibers 8, 108 perform the same function in this embodiment, in that they both signal when substantially all turns of the auxiliary yarns 7 have broken, and the cable 1 should be replaced. Due to unequal loading, it could be that the turns of the auxiliary yarns 7 at one side of the thimble 2 wear more quickly than at the other side. Accordingly it is advantageous to have two optical fibres/fibers 8, 108 at the same height h1, but at opposite sides of the thimble 2. If the turns of the auxiliary yarns 7 at one side break earlier than at the other side, this will result in breaking of the first or third optical fibre/fiber 8, 108 which is at the side where more turns of the auxiliary yarns 7 have broken.

The cable 1 has a second and fourth optical fibre/fiber 18, 118, which are provided at the first thimble 2 between the turns of the auxiliary yarns 7 at a second predetermined height h2 of the main stack 9. The second predetermined height h2 of the main stack 9 is less than the first predetermined height h1 of the main stack 9, in this case 3% of the stack height h. The second and fourth optical fibre/fiber 18, 118 perform the same function, in that they both provide an early warning about the wear of the turns of the auxiliary yarns 7. There are two optical fibres/fibers 18, 118 in this embodiment at the second predetermined height h2 of the main stack 9, spaced apart in the width direction of the first thimble 2, in case there is an unequal load and resulting unequal wear of the turns of the auxiliary yarns 7.

Figure 7:
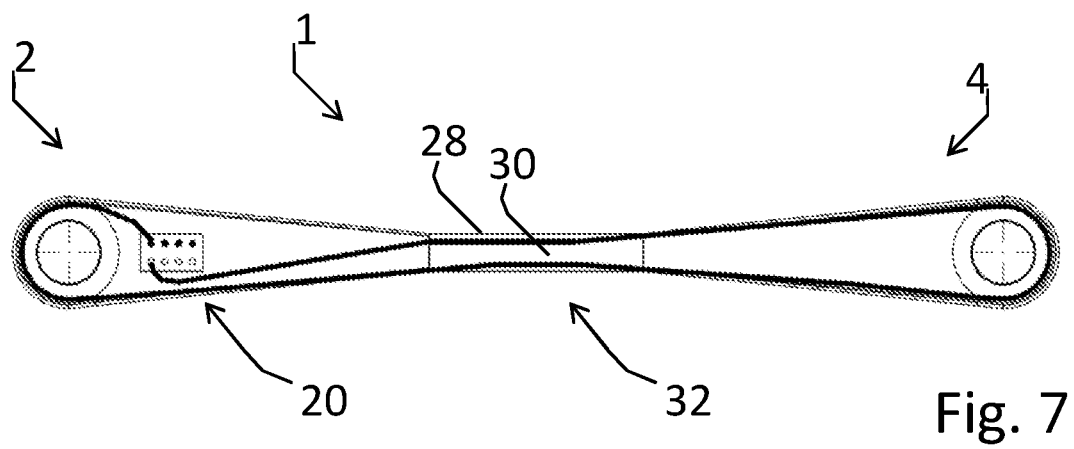
FIG. 7 shows a plan view of the cable of FIG. 1.

FIGS. 6 and 7 show that in this embodiment, the first optical fibre/fiber 8 extends from the first thimble 2 to the second thimble 4, and is positioned at the second thimble 4 between the main 6 and the auxiliary yarns 7 at the same first predetermined height h1 of the main stack 9 measured from the inside of the stack as at the first thimble 2.

Figure 8:
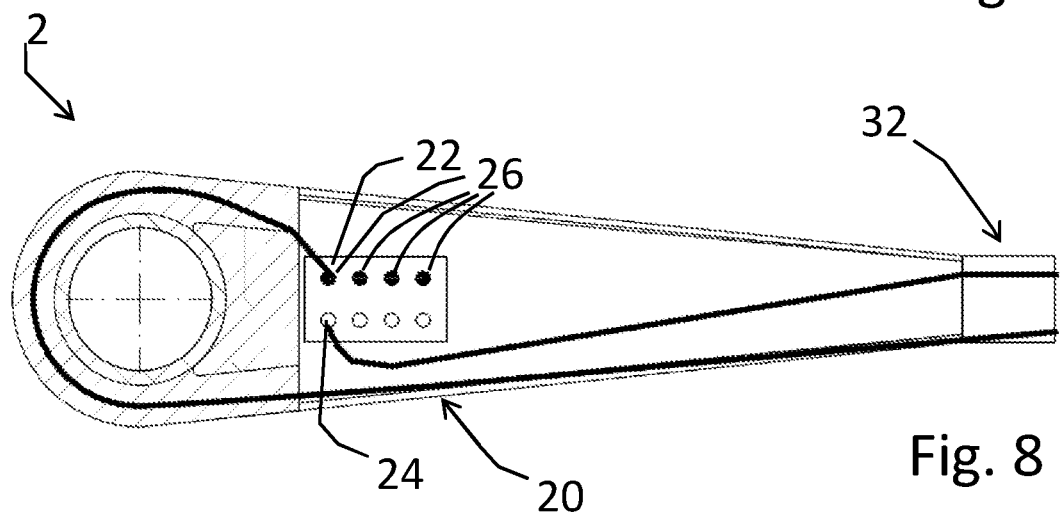
FIG. 8 shows section VIII-VIII from FIG. 6.
Figure 9:
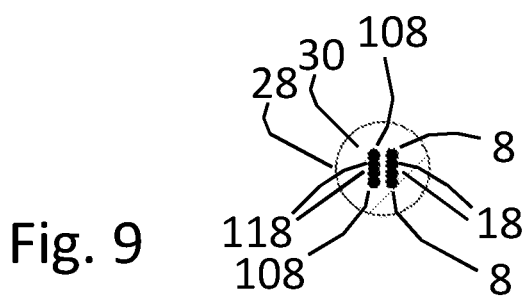
FIG. 9 shows section IV-IV from FIG. 6.

FIGS. 1, 7, and 8 show a casing 20. Both ends 22, 24 of the first optical fibre/fiber 8 are located in the casing 20.

In this embodiment, the above description relating to the presence of the first optical fibre/fiber 8 at the second thimble 4, and the position of the ends in the casing 20 applies to the second, third, and fourth optical fibres/fibers 18, 108, 118 too, and is not shown in FIGS. 6, 7 and 8 for the sake of clarity.

A light source, in this embodiment a laser light 26, is provided in the casing 20 and is operatively connected to the first end 22 of the first optical fibre/fiber 8. Further laser lights 26 are connected to the first ends of the second, third, and fourth optical fibres/fibers (not shown in FIG. 8).

A cable cover 28 extends around the cable 1 from the first thimble 2 to the second thimble 4, and bundles all turns of the main yarns 6 and the auxiliary yarns 7 extending between the first and the second thimble 2, 4 in one compact bundle 30 in a middle section 32 of the cable 1. In this embodiment, the cable cover 28 also covers the turns of the main yarns 6 and the auxiliary yarns 7 at the thimbles 2, 4. In this embodiment, the casing 20 is located between the middle section 32 of the cable 1 and thimble 2.

Referring to FIG. 2, the first thimble 2 has a bearing surface 40. In this embodiment, the bearing surface 40 is a cylindrical shaped surface, wherein the centre/center of the cylindrical shaped surface coincides with the centre/center 14 of the thimble 2. The first layer of turns of the auxiliary yarns 7 lies on the bearing surface 40 of the thimble 2. The bearing surface 40 of the thimble 2 has been pre-treated by manually polishing the surface to a surface roughness RA of approximately 0.3 μm. The bearing surface 40 is provided with a friction reducing coating 42, in this embodiment a coating that polytetrafluoroethylene (PTFE, sold under the trade mark Teflon®). In this embodiment, the PTFE coating comprises a resin that ensures adhesion of the coating to the bearing surface, which coating system is sold under the name Cruson 166 by Cruson Coatings B.V. The layer thickness of the coating is 20-30 μm. In this embodiment, the second thimble 4 has a bearing surface with the same shape as bearing surface 40, and is also provided with a coating of PTFE. Applying such coatings 42 on a manually polished bearing surface 40 results in an increase of the life span.

The cable 1 is used in the following manner in an embodiment of the invention, to monitor the cable and determine the residual strength. A user measures whether the second and fourth optical fibres/fibers 18, 118 are still conductive to light. To this purpose, the second and fourth optical fibres/fibers are permanently connected to the laser lights 26, which in turn are operatively connected to a battery (not shown). It is also possible to provide a switch between the battery and the laser lights 26, or to connect a battery to the laser lights each time the measurement is performed. If the second and fourth optical fibres/fibers 18, 118 are conductive to light, then light will emit from the respective ends 24 in the casing 30, which will be observed by the user. If both ends 24 emit light, then it is known that the cable 1 has at least a certain residual strength.

The measurement will be repeated after a predetermined amount of time. The length of the predetermined amount of time depends on the design and use of the cable, and may be displayed as a graph or table in a service manual. If, for instance, the design life span is three years, then the predetermined amount of time may be one or more months, but less than a year. If the design life span is for instance ten years, or more, then the predetermined amount of time may be one or several years.

If it turns out at the measurement that one of, or both, the second and fourth optical fibre/fiber 18, 118 is not conductive anymore, then the user knows that turns of the auxiliary yarns 7 that correspond to the height h2 of the second and fourth optical fibre/fiber have worn, and that he has to prepare to replace the cable 1 in the near future. Such preparations will typically include ordering a replacement cable.

According to this embodiment of the invention, the user repeatedly monitors whether the first and in this case third optical fibres/fibers 8, 108 are still conductive to light in the same manner as described in relation to the second and fourth optical fibres/fibers 18, 118. As long as both the first optical fibre/fiber 8 and the third optical fibre/fiber 108 still emit light at their second ends 24, the cable 1 is still safe to use and the measurement should be repeated after a predetermined amount of time. This predetermined amount of time may be specified in the service manual, and may be the same as, or different from, in particular shorter than, the predetermined amount of time for measuring if the second and fourth optical fibres/fibers 18, 118 are still conductive to light. If either the first optical fibre/fiber 8 the third optical fibre/fiber 108, or both, is no longer conductive to light, the user should stop using the cable within a replacement period. In this embodiment, the replacement period is zero days. In other words, the user should immediately stop using the cable 1 and replace it with a new one. Thanks to the low friction and high modulus of elasticity of the first layer of HMPE fibres/fibers, the cable of this embodiment of the invention can take up to 40 million load cycles, which is very favourable compared to the approximately 70,000 load cycles of a comparable steel cable.

Figure 10:
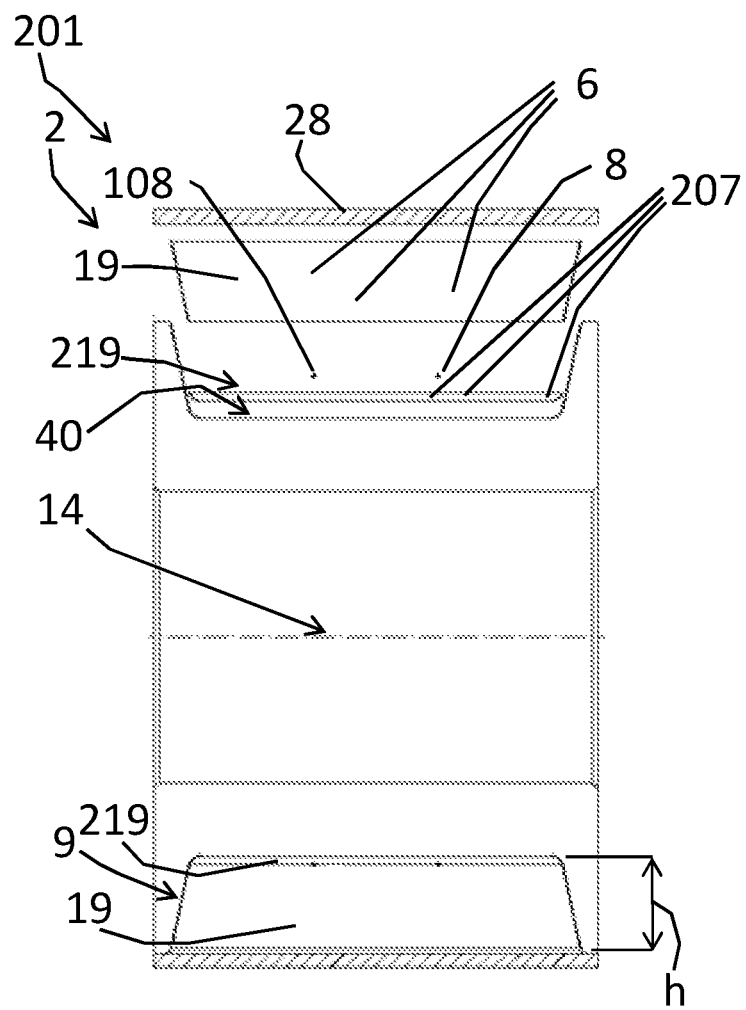
FIG. 10 shows a cross section through a thimble of a second embodiment of a cable according to the invention.

FIG. 10 shows a cable 201 according to a second embodiment of the invention. Elements of the cable 201 that are similar to that of the first embodiment are denoted with the same reference numbers and will not be described in detail. While FIG. 10 shows a cross section through a first thimble 2 of the cable 201, it is understood that there is a second thimble as well, and the side and top views of cable 201 are similar to those of the first embodiment, as described above.

The cable 201 comprises a plurality of main yarns 6, and a plurality of conductive fibres/fibers, in this embodiment two optical fibres/fibers 8, 108, for signalling wear of the cable 201. The first 2 and the second thimble are made of stainless steel, and are provided at opposite ends of the cable 201. The plurality of main yarns 6 are in this embodiment ten main yarns 6 which all form turns over the first and the second thimble. The main yarns 6 consist of fibres/fibers, in this embodiment aramid fibres/fibers of 3220 dTex. The cable further comprises a sheet 219, woven of auxiliary yarns 207. The auxiliary yarns 207 consist of fibres/fibers, in this embodiment HMPE fibres/fibers.

FIG. 10 shows that the thimble 2 holds a main stack 9 which comprises a stack 19 with a plurality of layers 10 of turns of the main yarns 6, and the sheet 219 made of the auxiliary yarns 207. The sheet 219 made of the auxiliary yarns 207 is provided on a bearing surface 40 of the first thimble 2. It lies on that part of the bearing surface 40 that actually holds main yarns 6 and extends a couple of centimetres beyond the bearing surface 40, substantially in the same direction as the main yarns 6.

The stack 19 of layers 10 of turns of the main yarns 6 is provided on the sheet 219 of the auxiliary yarns 207. The second thimble holds layers of the same turns of the main yarns 6 and a second sheet woven of the auxiliary yarns 207 in the same manner, and is not shown in detail. The properties of the auxiliary yarns 207, in this embodiment both a higher modulus of elasticity, and a lower friction coefficient, than the fibres/fibers of the main yarns 6, result in a lower wear of the auxiliary yarns 207, than the wear of the main yarns 6 if these were in direct contact with bearing surface 40.

The first, and second optical fibres/fibers 8, 108 are designed to signal the wear of the turns of the auxiliary yarns 207 by breaking when a predetermined portion of the turns of the auxiliary yarns 207 break, as has been described in more detail relating to the first embodiment. In this embodiment the first and second optical fibre/fiber 8, 108 are positioned at the first thimble 2 between the main yarns 6 and the auxiliary yarns 207 at a first predetermined height of the main stack 9, spaced apart in the width direction of the first thimble 2. The first predetermined height is in this embodiment 2% of the stack height h and equals the thickness of the sheet 219. The first and second optical fibres/fibers 8, 108 perform the same function in this embodiment, in that they both signal when substantially all the auxiliary yarns 207 of the sheet 219 have broken, and the cable 201 should be replaced. Due to unequal loading, it could be that the auxiliary yarns 207 at one side of the thimble 2 wear more quickly than at the other side. Accordingly it is advantageous to have two optical fibres/fibers 8, 108 at the same height, but at opposite sides of the thimble 2, as described above.

A cable cover 28 extends around the cable 201 from the first thimble 2 to the second thimble, and bundles all turns of the main yarns 6 extending between the first and the second thimble 2 in one compact bundle in a middle section of the cable 201. Moreover, the cable cover 28 covers both the main yarns 6 and the sheet 219 of the auxiliary yarns 207 at the thimbles.

The first thimble 2 has a bearing surface 40. In this embodiment, the bearing surface 40 is a cylindrical shaped surface, wherein the centre/center of the cylindrical shaped surface coincides with the centre/center 14 of the thimble 2. The sheet 219 of the auxiliary yarns 7 lies on the bearing surface 40 of the thimble 2. The bearing surface 40 of the thimble 2 has been pre-treated by manually polishing the surface to a surface roughness RA of approximately 0.3 μm. The bearing surface 40 of this embodiment is not provided with a friction reducing coating. The second thimble has a bearing surface with the same shape as bearing surface 40.

Several variants are possible within the scope of the attached claims. The features of the above described preferred embodiments may be replaced by any other feature within the scope of the attached claims, such as the features described in relation to the other preferred embodiment, and in the following paragraphs.

Different types of main yarns may be used, such as aramid yarns with a weight of 1610 dTex, 6440 dTex, or 4830 dTex, with or without a coating. Instead of using aramid fibres/fibers, one could use other types of plastic fibres/fibers, such as polyamide fibres/fibers, polyester fibres/fibers, polypropylene fibres/fibers, polyethylene fibres/fibers, HMPE fibres/fibers, LCAP fibres/fibers, or PBO fibres/fibers. The cable could even comprise other types of main yarns, e.g. yarns made of carbon fibres/fibers, a metal, or a natural fibre/fiber, such as fibres/fibers made of basalt. Yarns of fibres/fibers may consist for 100% of the relevant fibre/fiber type, but could also comprise a small portion of an auxiliary material, e.g. a coating on the fibres/fibers to protect the fibres/fibers against wear and/or environmental influences. As such auxiliary material is only a small portion in weight, and does not contribute to the strength of the cable, the phrase 'yarn consisting of fibres (yarn consisting of fibers)' is considered to include embodiments with such auxiliary materials within the context of this document.

Alternative fibre/fiber types for the auxiliary yarns or sheet are fibres/fibers with a higher modulus of elasticity, and/or a lower friction coefficient relative to stainless steel, than the fibres/fibers of the main yarn of the relevant cable.

A cable according to the invention may be made of more or less than ten main yarns, such as one main yarn, two main yarns, or at least five main yarns. The number of main yarn turns depends on the required strength of the cable, and the strength of one individual main yarn, as well as the required safety margin. The number of main yarn layers depends on the required number of main yarn turns, and the available width in the thimble resulting in a maximum number of main yarn turns in the width direction.

A cable according to the invention may be made of more or fewer than ten auxiliary yarns, such as one auxiliary yarn, two auxiliary yarns, or at least five auxiliary yarns. The number of auxiliary yarn layers in the stack of layers is at least one, but is usually a plurality of layers. The number of layers depends on the required life time of the cable; the more layers, the longer it takes before the auxiliary yarns are worn, resulting in a direct contact between the main yarns and the bearing surface of the thimble. Instead of two distinct layers of auxiliary and main fibres/fibers, other embodiments are possible. An embodiment has at least one stack with both auxiliary yarns and main yarns, in particular a first stack with auxiliary yarns, and a second stack with both auxiliary and main yarns. A further embodiment comprises a third stack with only main yarns. Another embodiment has more than two types of yarn, preferably arranged in separate stacks, and/or in one or more stacks, each stack comprising one or more types of yarn.

The sheet with fibres/fibers of the second type may be a woven sheet, a non-woven sheet, a braided sheet, or a knitted sheet. The sheet with fibres/fibers of the second type is positioned on the bearing surface of the respective thimble before the main yarns are wound around the thimbles. The sheet with fibres/fibers of the second type of the shown embodiment is draped over the bearing surface and its loose ends extend beyond the bearing surface. In an alternative embodiment, the sheet with fibres/fibers of the second type is wound around the respective thimble one or a plurality of times before the main yarns are wound around the thimbles.

Although it is preferred to provide a casing and a permanent laser light, one could also have the ends installed in a casing without permanent laser light or the loose ends of the conductive fibre/fiber exiting the cable and connect a measuring device, in case of an optical fibre/fiber a laser light, to one end of the conductive fibre/fiber each time the cable is tested.

The conductive fibre/fiber can be any fibre/fiber capable of carrying a signal. Instead of an optical fibre/fiber, another type of conductivity is possible within the scope of the invention, such as an electric conductive fibre/fiber, for example a carbon fibre/fiber or an electrical conductive metal fibre/fiber.

The most important location to monitor the wear is the area where the yarn turns first reach the thimble and start turning around the thimble. It would suffice within the scope of the invention to just provide a conductive fibre/fiber there, or conductive fibres/fibers at the respective entering/exit points of the yarn turns at each thimble.

In a simple embodiment, there may be one conductive fibre/fiber at one first predetermined height to signal just when the cable needs to be replaced immediately, or at a known moment in the near future. Alternatively one can have multiple conductive fibres/fibers at this first predetermined height for this purpose. In particular, the one or more conductive fibres/fibers at the first predetermined height may be there to signal when it is time to order a new cable. The user may continue to use the cable for a certain period of time when one or more of these conductive fibres/fibers are not conductive anymore, which certain period of time depends on the use, actual time to the moment that the conductive fibre/fiber was not conductive anymore, and predicted life span of the cable. This may be displayed in a graph and/or table in the service manual.

The number of conductive fibres/fibers at the first predetermined height may be one, or two, or more than two. The number of conductive fibres/fibers at the second predetermined height may be one, or two, or more than two. The number of conductive fibres/fibers at the first and second predetermined height may be the same, or different. At one height, there may be one conductive fibre/fiber, while at the other height there may be multiple conductive fibres/fibers, e.g. two, three, four or more.

In an embodiment there may be conductive fibres/fibers at more than one or two predetermined heights, in particular at three or more predetermined heights. This increases the insight in the wear and remaining life span of the cable.

In an embodiment, there is at least one conductive fibre/fiber in the stack of main fibres/fibers, in order to signal whether a part of the main fibres/fibers have worn.

A service manual showing the predetermined periods of time, and remaining life spans, may be a paper manual or a digital manual which latter may be an off-line program on a computer, or smartphone, or other suitable digital device of a user or the supplier of the cable, and/or an on-line application on a web page.

The replacement period may be more than zero days, and depends on the design and life span of the cable, as well as the time that it took from the moment the cable came into use to the conductive fibre's/fiber's failure. The replacement period may be specified in the service manual. This is in particular useful if the cable only comprises one or more conductive fibres/fibers at one height. In such an embodiment, there is no pre-warning indicating that a new cable should be ordered. It is advantageous in such an embodiment to position the conductive fibre/fiber at a predetermined height, corresponding to the wear of a portion of yarn turns that is still well within a safety limit.

Instead of inputting light at one end of an optical fibre/fiber, and observing whether light comes out at another end, one could also input light and observe at the same end. This can be advantageous when the cable is relatively long, such as cables used for the mooring of floating offshore structures. In such an embodiment, the optical fibre/fiber is provided with a mirror for reflecting light beyond at least one thimble. Preferably, such a mirror is a distributed Bragg reflector, such as a fibre/fiber Bragg grating. If no light is reflected by the distributed Bragg reflector, the optical fibre/fiber is broken between the end where the light is inputted and measured and the distributed Bragg reflector.

In a further embodiment, the measuring of the conductive fibre/fiber is done in an automated fashion. A source of power, such as a battery or a solar panel, is provided, as well as an electronic control circuit that comprises a wired or wireless transmitter, such as a WiFi transmitter or a Bluetooth transmitter, and an optical eye. The control circuit provides an electric pulse, which is transformed into light by a laser in the case of an optical fibre/fiber. The control circuit determines whether the conductive fibre/fiber is still conductive, by measuring whether light, or electric current in the case of an electric conductive fibre/fiber, comes out at the other end of the conductive fibre/fiber and activates the optical eye. The result of the measurement is transmitted to an external computer via the transmitter. The control circuit may comprise a timer for performing the measurement at predetermined time intervals, or may perform the measurement on request via the external computer.

The thimble may be made of a plastic instead of a metal, or of a different metal than stainless steel, including but not limited to different steel alloys, aluminium alloys, magnesium alloys, and titanium.

The bearing surface may have one of several shapes, such as part of a cylinder, part of an ellipsoid, or another curved surface. The coating may comprise another fluoropolymer, such as a poly(perfluoroalkoxy alkane) (PFA), poly(fluorinated ethylenepropylene) (FEP), polyvinylidene fluoride (PVDF), polyethylenechlorotrifluoroethylene (ECTFE), and/or polyethylenetetrafluoroethylene (ETFE). In a variant the coating comprises micro chrome plating, tungsten disulphide (such as sold under the trade mark Dicronite® by Lubrication Sciences International), BAM (aluminium magnesium boride), ceramic coating, titanium nitride (TiN), and/or diamond-like carbon (DLC). Several bonding methods between the thimble and the coating are possible, depending on the type of coating and the material and pre-treatment of the bearing surface, including using primers, adhesives and using form fit. Instead of both, the bearing surface of just one thimble may have a friction reducing coating.

Applying a coating on the bearing surface is also advantageous when only main yarns are used. Tests have shown that in an embodiment with main yarns made of aramid fibres/fibers, applying a PTFE coating on a manually polished bearing surface results in an increase of the life span, in terms of the number of load cycles, of the first layer of yarns of approximately three to seven times the life span of a similar layer of yarns on a bearing surface of manually polished steel without a coating. If auxiliary yarns are applied according to the invention, a coating does improve life span, but the effect is less than in a cable without auxiliary yarns. Likewise, the effect of a coating on the main fibres/fibers is less in a cable with auxiliary yarns than in a cable without auxiliary yarns. It will be appreciated that, when a coating is present, the relevant friction coefficient is the friction coefficient between the auxiliary yarn and the coating material.

Instead of manually polishing the bearing surface, one may apply electro polishing to the bearing surface, which results in an even smoother surface.

It is possible to have a cable with both a friction reducing coating and a conductive fibre/fiber, as in the preferred embodiment, but it is also advantageous to have a cable comprising an auxiliary yarn or sheet, and a thimble with a friction reducing coating as claimed, but without a conductive fibre/fiber, or a cable comprising an auxiliary yarn or sheet and one or more conductive fibres/fibers, but without a friction reducing coating, or a cable comprising an auxiliary yarn or sheet with no conductive fibres/fibers and no friction reducing coating.

The invention claimed is:

1. A cable, comprising:
a first thimble and a second thimble, and at least one main yarn, wherein
the at least one main yarn comprises fibers of a first type,
the first thimble and the second thimble are provided at opposite ends of the cable,
the at least one main yarn extends from the first thimble to the second thimble, turns around the second thimble, extends from the second thimble to the first thimble, and turns around the first thimble, such that the at least one main yarn forms turns around the first and second thimbles, each thimble comprises a bearing surface, and holds a stack of layers of turns of the at least one main yarn,
and wherein the cable comprises fibers of a second type, wherein the second type is different from the first type,
a stack comprising at least a first layer of the fibers of the second type that lies on the bearing surface of at least one of the first and second thimbles,
and
wherein the stack of layers of turns of the at least one main yarn is located on top of the stack of the fibers of the second type.

2. The cable according to claim 1, wherein the fibers of the second type have a friction coefficient relative to a material of the bearing surface which is lower than a friction coefficient relative to a material of the bearing surface of the fibers of the first type, and/or wherein the fibers of the second type have a modulus of elasticity which is higher than the modulus of elasticity of the fibers of the first type.

3. The cable according to claim 1, further comprising at least one auxiliary yarn, which comprises the fibers of the second type, wherein the auxiliary yarn extends from the first thimble to the second thimble, turns around the second thimble, extends from the second thimble to the first thimble, and turns around the first thimble, such that the auxiliary yarn forms turns around the first and second thimbles, and wherein the first layer of the fibers of the second type is a first layer of turns of the auxiliary yarn.

4. The cable according to claim 1, wherein the stack of the fibers of the second type comprises a plurality of layers.

5. The cable according to claim 1, wherein an overall stack height (h) is defined as the distance from the first layer of the fibers of the second type to a last layer of turns of the main yarn, and a stack height (h1) of the layers of the fibers of the second type is at least 1% of the overall stack height (h).

6. The cable according to claim 1, wherein an overall stack height (h) is defined as the distance from the first layer of the fibers of the second type to a last layer of turns of the at least one main yarn, and a stack height (h1) of the layers of the fibers of the second type is less than 25% of the overall stack height (h).

7. The cable according to claim 1, wherein the bearing surface of at least one of the thimbles is coated with a friction reducing coating.

8. The cable according to claim 1, wherein the thimble is a metal thimble.

9. The cable according to claim 8, wherein the bearing surface has a surface roughness $R_A$ in the range of 0.1-3.0 μm.

10. The cable according to claim 1, comprising at least a first conductive fiber for monitoring the cable, wherein the first conductive fiber is positioned at the first thimble in the stack of layers of turns of the at least one main yarn or in the stack of the fibers of the second type.

11. The cable according to claim 10, wherein the first conductive fiber is positioned between the stack of layers of turns of the at least one main yarn and the stack of the fibers of the second type.

12. The cable according to claim 1, wherein the cable comprises a plurality of conductive fibers, and wherein at least two of the plurality of conductive fibers are positioned at the first thimble at the same layer of turns of the at least one main yarn or fibers of the second type, spaced apart from each other in a width direction of the first thimble.

13. The cable according to claim 1, further comprising a cable cover which extends around the cable from the first thimble to the second thimble, and bundles all main yarns and fibers of the second type extending between the first and the second thimble in one compact bundle in a middle section of the cable.

14. The cable according to claim 1, wherein the fibers of the first type are carbon fibers, basalt fibers, polyamide fibers, polyester fibers, polypropylene fibers, polyethylene fibers, aramid fibers, LCAP fibers, or PBO fibers.

15. The cable according to claim 1, wherein the fibers of the second type are HMPE fibers.

16. A method for producing an endless winding cable, comprising the steps of:
  positioning a first thimble with a first bearing surface and a second thimble with a second bearing surface at a predetermined distance from each other, which distance corresponds to a required cable length,
  providing at least one main yarn comprising fibers of a first type,
  providing fibers of a second type, wherein the second type is different from the first type,
  forming a stack comprising at least a first layer of the fibers of the second type on either the first bearing surface or the second bearing surface of at least one of the first and second thimbles,
  winding the at least one main yarn on top of the stack of the fibers of the second type from the first thimble to the second thimble, a half turn around the second thimble, back to the first thimble, and a half turn around the first thimble, and
  repeating the previous step until a predetermined number of layers of turns of the at least one main yarn is provided on both the first thimble and the second thimble.

17. The method according to claim 16, wherein forming a stack comprising at least the first layer of the fibers of the second type on either the first bearing surface or the second bearing surface of at least one of the first and second thimbles comprises:
  providing an auxiliary yarn comprising the fibers of the second type,
  winding the auxiliary yarn from the first thimble to the second thimble, a half turn around the second thimble, back to the first thimble, and a half turn around the first thimble, and
  repeating the previous step until a predetermined number of layers of turns of the auxiliary yarn is provided in both the first thimble and the second thimble.

18. The method according to claim 16, wherein forming a stack comprising at least the first layer of the fibers of the second type on either the first bearing surface or the second bearing surface of at least one of the first and second thimbles comprises:
  providing a sheet with fibers of the second type, and
  positioning the sheet on the bearing surface of the respective thimble before winding the at least one main yarn around the first and the second thimble.

19. A cable, comprising:
  a first thimble and a second thimble, and at least one main yarn, wherein the at least one main yarn comprises fibers of a first type,
  the first thimble and the second thimble are provided at opposite ends of the cable,
  the at least one main yarn extends from the first thimble to the second thimble, turns around the second thimble, extends from the second thimble to the first thimble, and turns around the first thimble, such that the at least one main yarn forms turns around the first and second thimbles, each thimble comprises a bearing surface, and holds a stack of layers of turns of the at least one main yarn, and wherein the cable comprises fibers of a second type, wherein the second type is different from the first type, and
  further comprising a sheet made of the fibers of the second type, wherein the sheet is positioned on the bearing surface of at least one of the first and second thimbles.

20. The cable according to claim 19, wherein the sheet made of the fibers of the second type comprises a non-woven sheet, a woven sheet, a braided sheet, or a knitted sheet.

* * * * *